(12) United States Patent
Halper

(10) Patent No.: US 6,755,605 B2
(45) Date of Patent: Jun. 29, 2004

(54) STICK PLACER (75) Inventor: Paul L. Halper, Enderby (CA)

(73) Assignee: Coe Newnes/McGehee ULC, Salmon Arm (CA)

( * ) Notice: Subject to any disclaimer, the term of this patent is extended or adjusted under 35 U.S.C. 154(b) by 184 days.

(21) Appl. No.: 10/134,549

(22) Filed: Apr. 30, 2002

(65) Prior Publication Data
US 2002/0159875 A1 Oct. 31, 2002

Related U.S. Application Data
(60) Provisional application No. 60/287,011, filed on Apr. 30, 2001.

(30) Foreign Application Priority Data
May 1, 2001 (CA) .............................................. 2345861

(51) Int. Cl.$^7$ ............................................. B65G 59/06
(52) U.S. Cl. .................................. 414/789.5; 414/798.1
(58) Field of Search .......................... 414/789.5, 797.7, 414/798.1

(56) References Cited

U.S. PATENT DOCUMENTS

| 2,928,559 A | 3/1960 | Mosely |
| 3,352,434 A | 11/1967 | Zuercher |
| 3,643,621 A | 2/1972 | Newnes |
| 3,738,510 A | 6/1973 | Mason |
| 3,823,834 A | 7/1974 | Rysti |
| 3,968,886 A | 7/1976 | Leon |
| 4,090,618 A | 5/1978 | Lehmann |
| 4,144,976 A | 3/1979 | Rysti |
| 4,229,133 A | 10/1980 | Johnson |
| 4,264,253 A | 4/1981 | Kennison |
| 4,324,520 A | 4/1982 | Kjellberg |
| 4,360,303 A | 11/1982 | Rysti |
| 4,610,360 A | 9/1986 | Forslund |
| 4,801,233 A | 1/1989 | Ritola |
| 4,810,152 A | 3/1989 | Gillingham et al. |
| 4,878,803 A | 11/1989 | Whiddon |
| 5,244,341 A | 9/1993 | Dion et al. |
| 5,636,965 A | 6/1997 | Newnes et al. |
| 5,863,176 A | 1/1999 | Newnes et al. |
| 6,065,927 A * | 5/2000 | Baron et al. ............. 414/789.5 |

* cited by examiner

Primary Examiner—Janice L. Krizek
(74) Attorney, Agent, or Firm—Antony C. Edwards (57) ABSTRACT A stick placer includes a stick magazine and a stick receiver. A stop regulates passage of the lowermost stick from a lower opening in the stick magazine. The stick receiver is rotatable and has a stick receiving pocket. The stick receiver is selectively rotatably mounted adjacent the lower opening in the stick magazine. The stick receiver is rotatable between a stick receiving position and a stick depositing position. In the stick receiving position the pocket cooperates with the lower opening so as to receive the lowermost stick into the pocket when the stop is selectively removed so as to release the lowermost stick from the lower opening in the magazine. In the stick depositing position, the stick receiver is angularly displaced from the stick receiving position so as to dispose the pocket for deposit of the stick from the pocket onto an upper tier of a stack of lumber. The stick receiver has a cam surface above the pocket for engaging the lowermost stick when the lowermost stick is not in flush engagement with the upper tier of the stack of lumber upon deposit from the pocket, for example when the upper tier is uneven or the stick is bent or bowed or lying side-on.

20 Claims, 7 Drawing Sheets

STICK PLACER

CROSS REFERENCE TO RELATED APPLICATION

This application claims priority from U.S. Provisional Patent Application No. 60/287,011 filed Apr. 30, 2001 and Canadian Patent Application No. 2,345,861 filed May 1, 2001 entitled Stick Placer.

FIELD OF THE INVENTION

This invention relates to the field of stick placer apparatus and, in particular, to spacing stick depositing mechanisms.

BACKGROUND OF THE INVENTION

Spacing stick placer apparatus are used to place spacing sticks between stacked tiers of green lumber. The sticks serve to provide space between the tiers of lumber to allow air flow for either kiln drying or air drying, as well as to stabilize the tiered lumber package. Typically, spacing stick placer apparatus are used in conjunction with lumber stackers that stack the green lumber in tiers, the stick placer apparatus conventionally being placed over the lumber stacker. The sticks are placed in spaced parallel array across the width of the lumber tiers, the sticks aligned perpendicular to the long dimension of the lumber. The number of sticks so placed depends upon the length of the lumber and the desired spacing between the sticks. In modern sawmill practices it is desired that the first and last stick of the array of sticks placed onto a tier of lumber be placed flush with the ends of the lumber.

It is conventional for sticks to be conveyed over the lumber stack from a stick allocating device by means of a continuous chain, for example a lugged chain. The lugs on the chain are translated past a stick allocating device. A pair of continuous chains co-operate with the stick allocating device so that opposed pairs of lugs receive single sticks from the stick allocating device and convey those sticks along the continuous chain over the lumber stack. The chains move linearly along an opposed pair of tracks supported above the lumber stack, the tracks supported conventionally by a support frame. The continuous chains are supported at either end of the opposed pair of tracks by sprockets, one of which is conventionally a drive sprocket, the other an idler sprocket.

As observed by Rysti in the U.S. Pat. No. 3,823,834, prior art includes several methods and devices for performing the insertion of piling strips in timber packages, but in all these methods and devices drawbacks have been observed, which above all are associated with the feeding of piling strips, whereby the operation of feeding piling strips has become the main factor restricting the capacity of piling strip insertion machines. In devices belonging to prior art, the feeding of piling strips is most commonly accomplished as follows: most commonly used is the method in which the piling strips are stacked in magazines, of which as many have been provided side by side as is the number of piling strips needed between the timber courses in each instance. When one timber course has been completed, the piling strips are caused to fall down on the course either by pushing them from the side, by pushing them from the end or by releasing them at the ends. Prior art also includes a method and devices wherein the piling strips are conveyed into positions above the timber course by means of an endless conveyor, from which the piling strips are caused to fall down or released to be deposited upon the completed course. A drawback encountered in those devices in which the piling strips are caused to fall down on the timber course is the bouncing of the strips, whereby they fail to be deposited in their correct positions and for example may end up lying on their side edges so that, because they are rectangular, the laying of the next tier is uneven. Disturbance of the intended piling strip distribution, again, may cause twisting and warping of the timber, and non-uniform drying. In addition to the problem of bowed or crooked sticks, the surface of a lumber stack is rarely completely level, given that each piece of lumber is usually not exactly the same shape as the adjacent piece or each may be warped, spacing sticks which are dropped or not positively placed increase the likelihood of the stick being bounced and misplaced.

Consequently it is an object of the present invention to provide a device for the positive placement of spacing sticks onto a stack of lumber. In this regard applicant is aware of U.S. Pat. No. 4,801,233 which issued to Ritola on Jan. 31, 1989 for a "Sticker Placer Apparatus" which teaches a device for the positive placement of spacing sticks onto a stack of lumber. Sticks are fed from a stick conveyor into inclined stick feeding pockets, the stick feeding pockets indexing individual sticks into the grip of actuable stick supporting and pinching arms rotatably mounted at the lowermost end of vertically translatable placement plungers. The vertical position of the placement plungers, and thus the position of the stick supporting and pinching arms, is governed in the Ritola device by an actuating arm releasing or increasing the tension on a flexible chain extending between the stick supporting and pinching arms and the actuating arm. Positive placement of a stick from the supporting and pinching arms is accomplished when the lowermost end of the vertically translatable placement plunger engages the top surface of a stack of lumber. Continuing detensioning of the flexible chain by the actuating arm allows the rotatably mounted stick support arm to rotate under the return biasing force of a resilient spring so as to deposit the stick from the support arm onto the stack of lumber.

SUMMARY OF THE INVENTION

The stick placer of the present invention includes a stick magazine and a stick receiver. The magazine may be mountable into cooperation with a stick diverter on a stick conveyor so as to divert sticks from the stick conveyor into the magazines. The magazine is for holding sticks in a generally planar mat so as to bias a lowermost stick in the mat against a selectively removable stop. The stop regulates passage of the lowermost stick from a lower opening in the stick magazine.

The stick receiver is rotatable and has a stick receiving pocket. The stick receiver is selectively rotatably mounted adjacent the lower opening in the stick magazine. The stick receiver is rotatable between a stick receiving position and a stick depositing position. In the stick receiving position the pocket cooperates with the lower opening so as to receive the lowermost stick into the pocket when the stop is selectively removed so as to release the lowermost stick from the lower opening in the magazine. In the stick depositing position, the stick receiver is angularly displaced from the stick receiving position so as to dispose the pocket for deposit of the stick from the pocket onto an upper tier of a stack of lumber.

The stick receiver has a cam surface above the pocket for engaging the lowermost stick when the lowermost stick is not in flush engagement with the upper tier of the stack of lumber upon deposit from the pocket, for example when the upper tier is uneven or the stick is bent or bowed or lying side-on.

The stick receiver may have a rounded lower surface defining a lower fork beneath the pocket. The lower fork may be thinner than a gap dimension of the pocket corresponding to a thickness of the sticks.

The stick magazine may be inclined and the mat may be a mat of the sticks laid flat so as to abut adjacent side surfaces of the sticks.

The pocket may be a generally rectangular channel in the stick receiver, the pocket sized to receive entirely within the pocket a lateral cross-section of the lowermost stick. The stick receiver may rotate generally 90 degrees between the stick receiving position and the stick depositing position. When in the stick depositing position, the pocket may be downwardly inclined. The cam may be adjacent the pocket. The pocket and a lower surface of the stick receiver may define a fork therebetween. The lowermost stick is supported on the fork when in the pocket. The cam may be a rigid projection, generally parallel to the fork, forming an upper edge of the pocket. The cam may have a rounded cam surface at a distal end of the projection. The rigid projection and the fork may be located on a common side of the stick receiver relative to an axis of rotation of the stick receiver.

The stick receiver may be at least one disc or may include a pair of discs mountable onto a shaft for rotation about a longitudinal axis of the shaft.

The shaft may be parallel to the lower opening of the magazine. The stop may be a lever arm pivotally mounted to the magazine and selectively pivotable by a selective actuator so as to urge an end of the lever arm between a closed position clamping the lowermost stick in the lower opening of the magazine, and an open position releasing the lowermost stick from the lower opening.

The fork may have a rounded under-surface, rounded according to a radius of curvature of the stick receiver about axes of rotation of the pair of discs. The pair of discs may have a common axis of rotation.

A rigid member may be mounted relative to the stick receiver so that as the pocket is rotated from the stick receiving position to the stick depositing position, a stick held in the pocket engages the rigid member so as to be urged by the rigid member from the pocket.

The stick receiver may be selectively positionable by a vertical positioning actuator between elevated and lowered positions. In the elevated position the stick receiver is adjacent the lower opening in the magazine and the pocket is in the stick receiving position. In the lowered position the stick receiver is adjacent the upper tier and the pocket is in the stick depositing position.

BRIEF DESCRIPTION OF THE DRAWINGS

FIG. 1a is, in enlarged partially cut-away view, the stick placers of FIG. 1.

DETAILED DESCRIPTION OF EMBODIMENTS OF THE INVENTION

Figure 1:
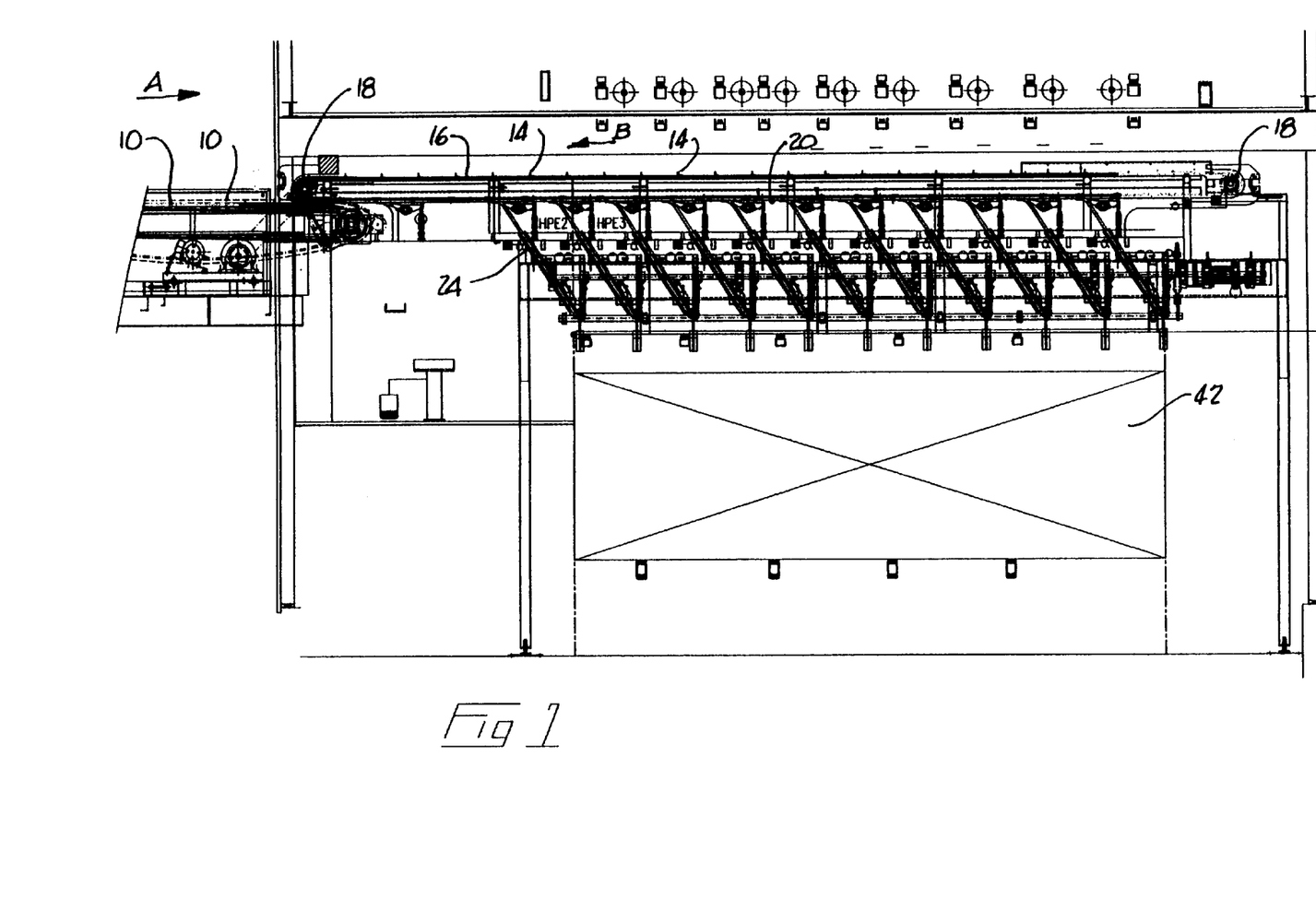
FIG. 1 is, in side elevation view, stick placers according to the present invention installed between a stick conveyor and a lumber stacker.
Figure 1B:
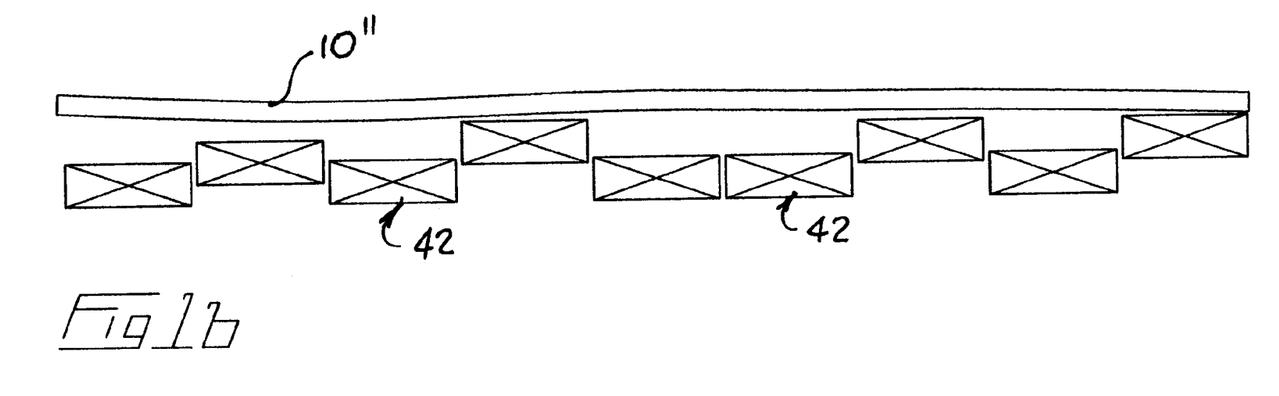
FIG. 1b is, in enlarged partially cut-away side elevation view, an uneven tier of lumber on the stack of FIG. 1 showing displacement of a stick.
Figure 1C:
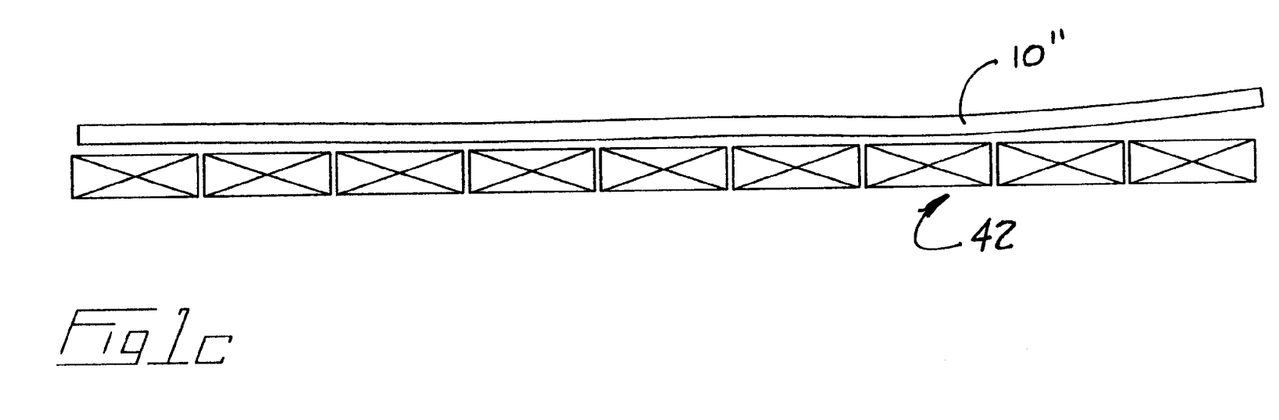
FIG. 1c is, in enlarged partially cut-away side elevation view, a bowed stick lying on an even tier of lumber on the stack of FIG. 1.
Figure 1D:
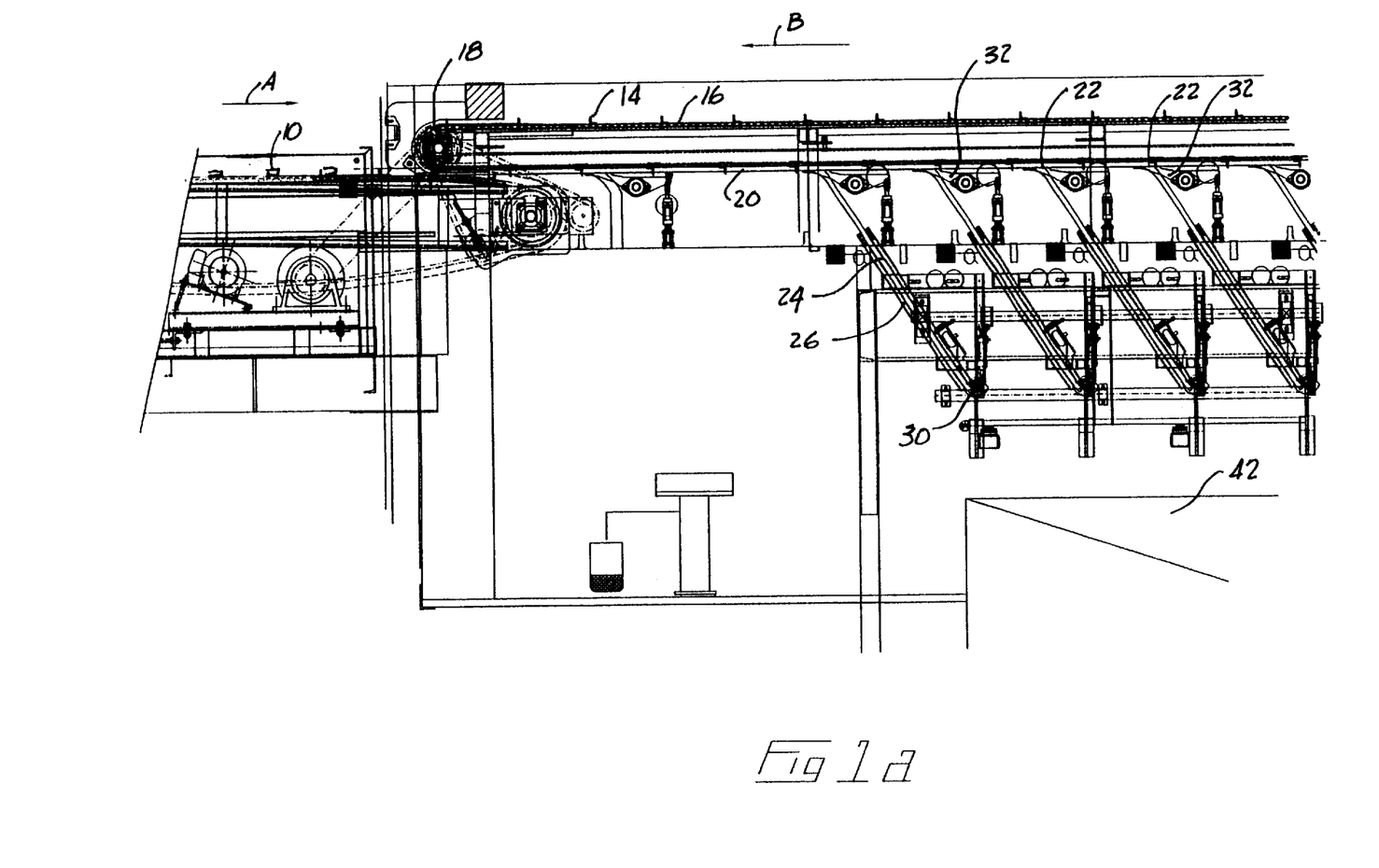

As seen in FIG. 1, spacing sticks 10, which may have nominal dimensions of ¾ inch by 1½ inch by 4 feet long, are conveyed in direction A on a spacing stick allocator 12. A spacing stick allocator (not shown) allocates spacing sticks 10, as would be known to one skilled in the art, into the lug spacing between lugs 14 on endless lugged conveyor or chain 16 rotating in direction B around sprockets 18.

Once spacing sticks 10 are allocated to individual lugs 14, the spacing sticks are slid along the lower chain run, pushed by the lugs over slide surface 20.

Slide surface 20 has a spaced apart array of apertures 22 coinciding with the entryways or openings into the upper end of slide pockets 24 formed between spaced apart pairs of inclined rails 26 such as better seen in FIGS. 2–5.

Slide pockets 24 function as storage magazines for spacing sticks 10 awaiting loading into receiving pockets 28 in rotating ejector cams 30 as better seen in FIGS. 6a–6c and 7.

As known in the prior art, apertures 22 at the entryways into slide pockets 24 are kept selectively closed by stick diverters 32 when in their lowered position such as better seen in FIG. 1a. When slide pockets 24 require loading with sticks 10, stick diverters 32, which will likely employ at least a pair of such diverters, are elevated so as to capture a spacing stick sliding over slide surface 20 thereby diverting the stick downwardly into the corresponding slide pockets 24 in direction C.

A spacing stick so captured slides under the force of gravity down slide pockets 24 so as to come to rest against the mat of spacing sticks being held against the lowermost spacing stick 10' being held awaiting release by clamping arm 34.

In the illustrated embodiment which is not intended to be limiting, clamping arm 34 pivots about pins or shaft 36 in direction D. Rotation of clamping arm 34 in direction D is accomplished by selective actuation of an actuator, for example, air bag 38 driving actuating lever 40 rigidly mounted to clamping arm 34.

Figure 2:
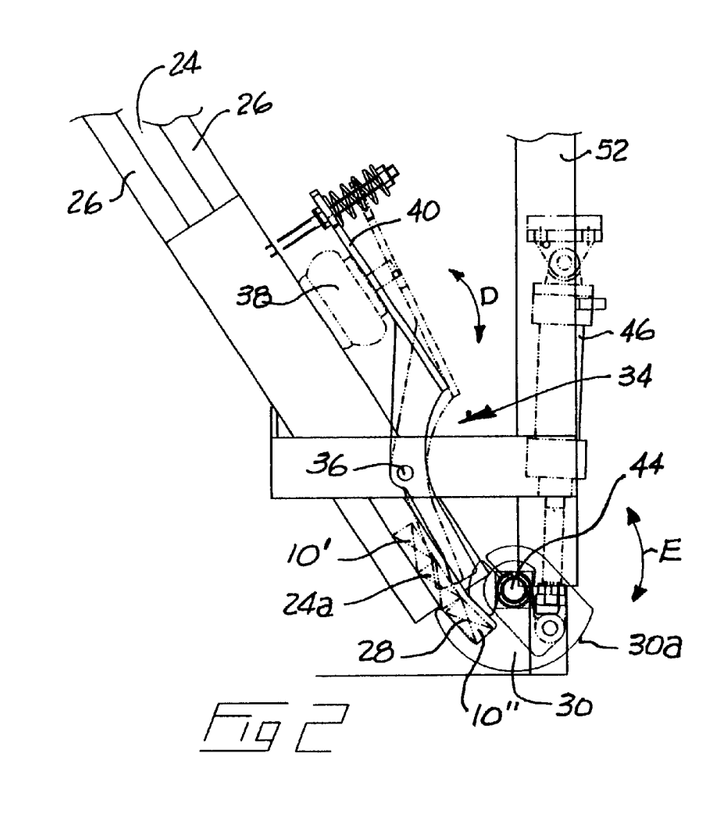
FIG. 2 is, in side elevation view, one of the stick placers of FIG. 1.
Figure 2A:
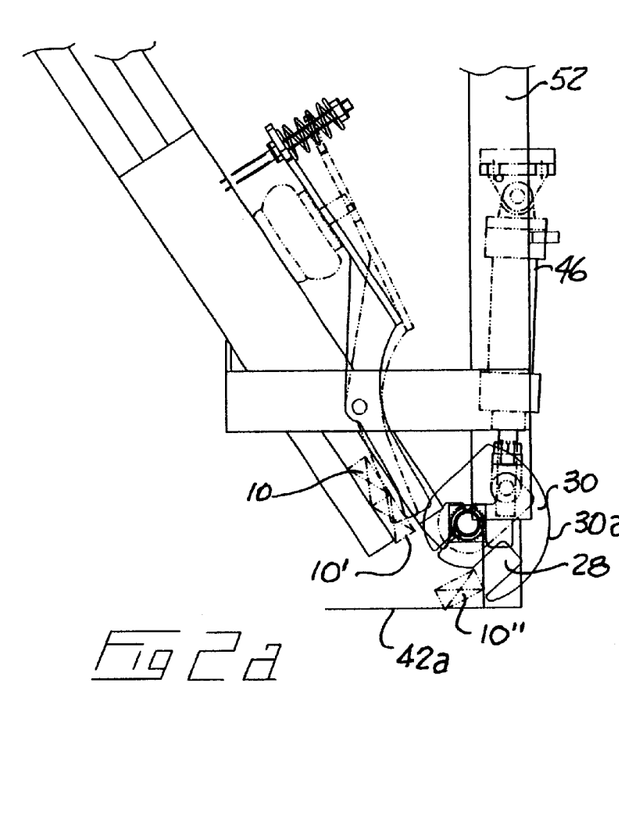
FIG. 2a is, in side elevation view, one of the stick placers of FIG. 1 with ejector cam in a rotated position.
Figure 3:
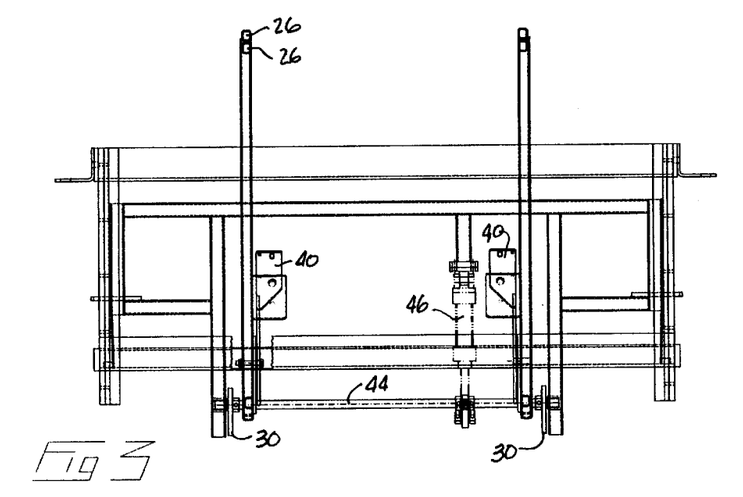
FIG. 3 is, in front elevation view, the stick placer of FIG. 2.
Figure 4:
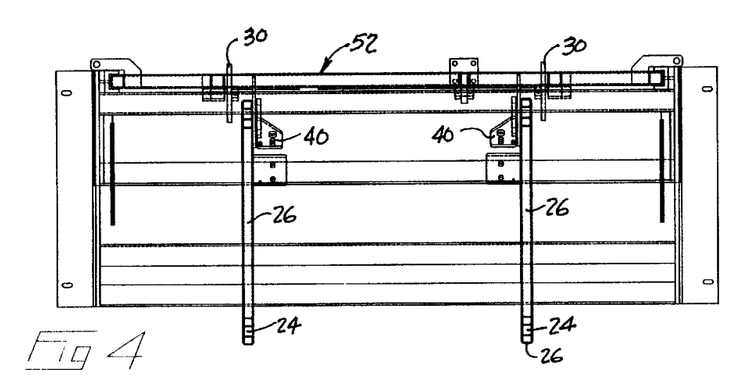
FIG. 4 is, in plan view, the stick placer of FIG. 2.
Figure 5:
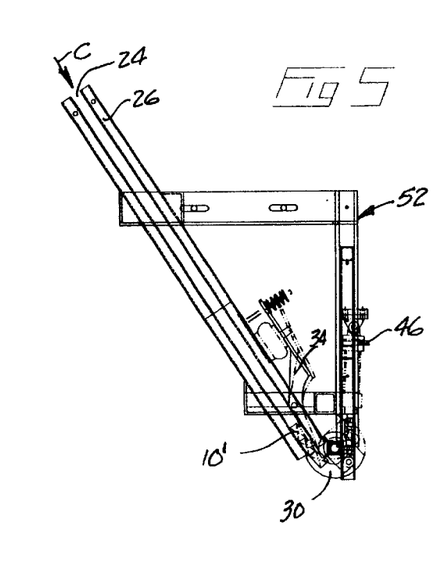
FIG. 5 is, in side elevation view, the stick ejector cam and ejector frame of the stick placer of FIG. 2.
Figures 6A, 6B, 6C, 7:
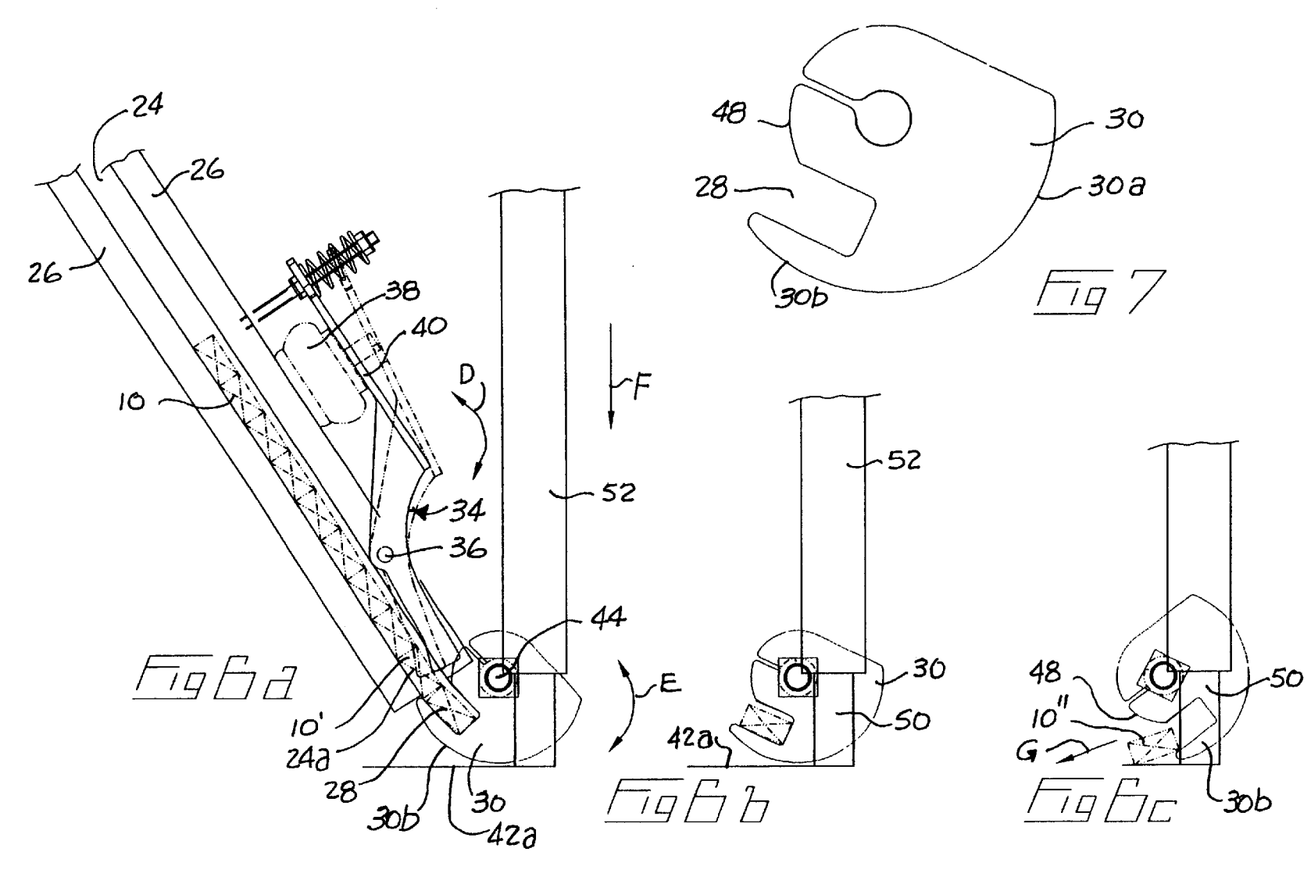
FIGS. 6a–6c are, in side elevation view, the ejector cams of FIG. 2 progressively rotated so as to eject a stick held in a receiving pocket of the ejector cam.
FIGS. 7, 7a–7g are, in side elevation views, the stick ejector cam of FIG. 2, FIGS. 7a–7g illustrating the cam being progressively rotated.

Rotating cams 30 may be a pair of such cams laterally spaced apart on shaft 44. When rotating cams 30 are in their stick pick-up position as seen in FIG. 2, and as also seen in FIGS. 5 and 6a, receiving pockets 28 are aligned co-operatively with the lowermost end 24a of slide pockets 24 so as to receive under the force of gravity a released spacing stick 10" into receiving pockets 28. Stick 10" is urged by the weight of the stored mat of spacing sticks 10 pressing down from above. Reference numeral 10' indicates the downstream-most stick 10 being held by clamping arm 34. Reference numeral 10" indicates a stick 10 which has been released by clamping arm 34 so as to reside in pockets 28.

Figure 7A:
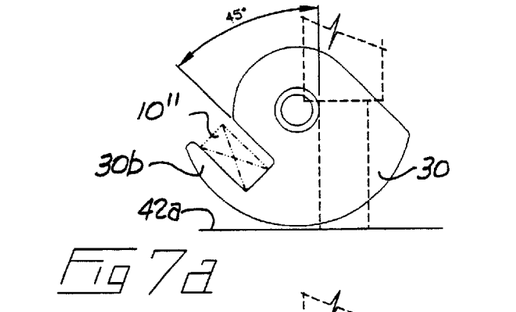
Figure 7B:
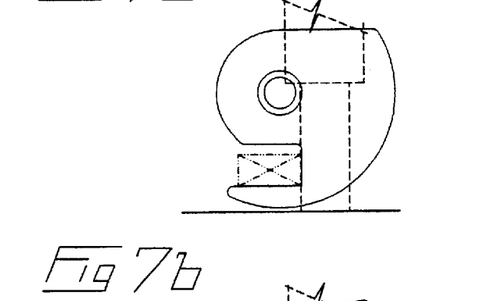
Figure 7C:
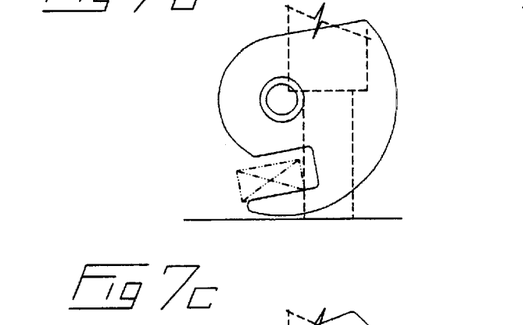
Figure 7D:
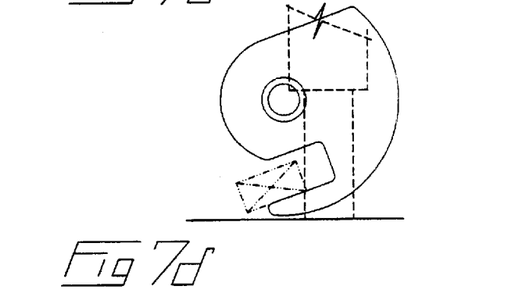

Once spacing stick 10" has been loaded into receiving pockets 28, clamping arm 34 is once again actuated so as to clamp spacing stick 10' in ends 24a of slide pockets 24. Cams 30 and shaft 44 are then lowered so as to position the lowermost surface of rounded outer surface 30a adjacent or in contact with the upper surface 42a of lumber stack 42. An actuator, for example cylinder 46 is also lowered as shaft 44 is lowered to bring cams 30 into proximity to stack 42. Once cams 30 are in their lowered position, cylinder 46 is actuated so as to rotate shaft 44 thereby rotating cams 30 in direction E such as illustrated in the progressive illustrations of FIGS. 6a–6c and 7a–7g. As seen in FIGS. 5, 6a and 7a, the spacing stick has been loaded into the receiving pocket of the cams and the cams and their actuating mechanism then lowered in direction F so as to place cams 30 adjacent upper surface 42a of lumber stack 42. The thickness of lower lip 30b which forms the lower side of receiving pockets 28 is minimized so that, as cams 30 smoothly rotate in direction E so as to pass the radial arc of outer surface 30a over upper surface 42a of the lumber stack, spacing stick 10" as it slides out of the receiving pockets 28, urged in direction G by stops 50, and contacts upper surface 42a approximately simultaneously as it clears the distal end of lip 30b. As lip 30b is extracted from under spacing stick 10", a first lower edge of spacing stick 10" contacts upper surface 42a if the tier of lumber is evenly flat and the stick is not bowed. Where the stick is not lying flat on the tier, for example because the tier is uneven or the stick bowed, a nose 48 (better seen in FIGS. 7 and 7a–7g) on each cam 30, in the illustrated embodiment corresponding to the upper outer edge of receiving pockets 28 positively presses down onto the stick so as to flatten it onto the tier, or at least prevents spacing stick 10" bouncing up from or turning or lying sideways on, upper surface 42a.

Figures 7E, 7F, 7G:
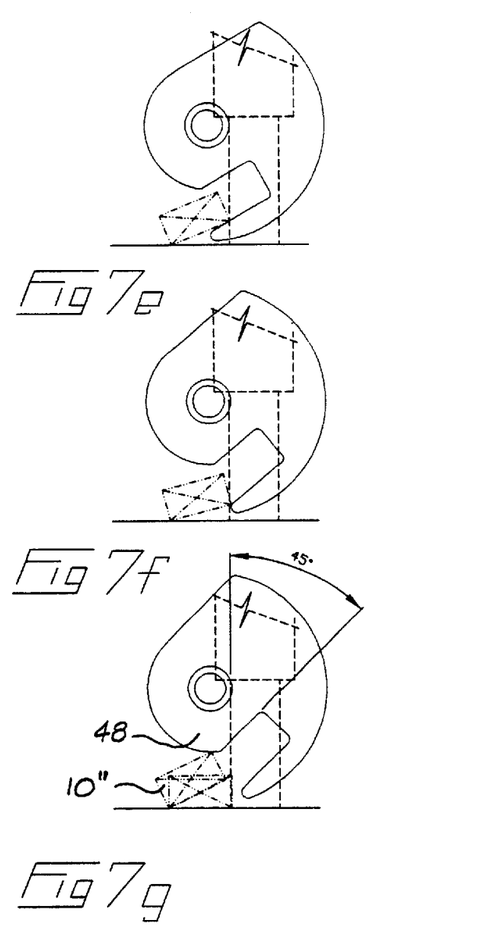

As cams 30 are rotated 90 degrees in direction E so as to downwardly tilt receiving pockets 28, a rigid stop 50 which projects downwardly from the ejector frame 52 engages the innermost side edge of spacing stick 10" so as to push the spacing stick from the receiving pockets during the continued rotation of cams 30 from their initial stick pick-up position of FIGS. 6a and 7a to their stick drop-off position of FIGS. 6c and 7g.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A stick placer comprising:

a stick magazine for holding sticks in a generally planar mat so as to bias a lowermost stick in said mat against a selectively removable stop, said stop regulating passage of said lowermost stick from a lower opening in said stick magazine, a rotatable stick receiver having a stick receiving pocket selectively rotatably mounted adjacent said lower opening in said stick magazine, said stick receiver rotatable between a stick receiving position, wherein said pocket cooperates with said lower opening so as to receive said lowermost stick into said pocket when said stop is selectively removed so as to release said lowermost stick from said lower opening, and a stick depositing position angularly displaced from said stick receiving position so as to dispose said pocket for deposit of said stick from said pocket onto an upper tier of a stack of lumber, said stick receiver having a cam above said pocket for engaging said lowermost stick when said lowermost stick is not in flush engagement with said upper tier of said stack of lumber upon deposit from said pocket.

2. The stick placer of claim 1 wherein said stick magazine has an upper opening mountable into cooperation with a stick diverter on a stick conveyor so as to divert sticks from said stick conveyor into said magazine.

3. The stick placer of claim 1 wherein said stop is a lever arm pivotally mounted to said magazine and selectively pivotable by a selective actuator so as to urge an end of said lever arm between a closed position clamping said lowermost stick in said lower opening of said magazine, and an open position releasing said lowermost stick from said lower opening.

4. The stick placer of claim 1 further comprising a rigid member mounted relative to said stick receiver so that as said pocket is rotated from said stick receiving position to said stick depositing position, a stick held in said pocket engages said rigid member so as to be urged by said rigid member from said pocket.

5. The stick placer of claim 1 wherein said stick receiver is selectively positionable by a vertical positioning actuator between an elevated position adjacent said lower opening in said magazine when said pocket is in said stick receiving position, and a lowered position adjacent said upper tier when said pocket is in said stick depositing position.

6. The stick placer of claim 1 wherein said stick receiver has a rounded lower surface defining a lower fork beneath said pocket.

7. The stick placer of claim 6 wherein said lower fork is thinner than a gap dimension of said pocket corresponding to a thickness of said sticks.

8. The stick placer of claim 1 wherein said stick magazine is inclined and said mat is a mat of said sticks laid flat so as to abut adjacent side surfaces of said sticks.

9. The stick placer of claim 8 wherein said pocket is a generally rectangular channel in said stick receiver, said pocket sized to receive entirely within said pocket a lateral cross-section of said lowermost stick.

10. The stick placer of claim 9 wherein said stick receiver rotates generally 90 degrees between said stick receiving position and said stick depositing position.

11. The stick placer of claim 10 wherein, when in said stick depositing position, said pocket is downwardly inclined.

12. The stick placer of claim 11 wherein said cam is adjacent said pocket and wherein said pocket and a lower surface of said stick receiver define a fork therebetween, said lowermost stick supported on said fork when in said pocket.

13. The stick placer of claim 12 wherein said cam is a rigid projection, generally parallel to said fork, forming an upper edge of said pocket, and having a rounded cam surface at a distal end of said projection.

14. The stick placer of claim 13 wherein said stick receiver is at least one disc mountable onto a shaft for rotation about a longitudinal axis of said shaft.

15. The stick placer of claim 13 wherein said rigid projection and said fork are located on a common side of said stick receiver relative to an axis of rotation of said stick receiver.

16. The stick placer of claim 15 wherein said stick receiver is at least one shaft mounted disc.

17. The stick placer of claim 16 wherein said at least one shaft mounted disc is a pair of discs mounted spaced apart on a shaft.

18. The stick placer of claim 17 wherein said shaft is parallel to said lower opening of said magazine.

19. The stick placer of claim 17 wherein said fork has a rounded under-surface, rounded according to a radius of curvature of said stick receiver about axes of rotation of said pair of discs.

20. The stick placer of claim 19 wherein said pair of discs have a common axis of rotation.

* * * * *